United States Patent
Prendergast et al.

(10) Patent No.: US 7,941,184 B2
(45) Date of Patent: May 10, 2011

(54) METHODS AND SYSTEMS FOR MANAGING AND/OR TRACKING USE OF SUBSCRIBER IDENTITY MODULE COMPONENTS

(75) Inventors: Liam N. Prendergast, Limerick (IE); Denis A. O'Connor, Limerick (IE); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1215 days.

(21) Appl. No.: 11/595,613

(22) Filed: Nov. 10, 2006

(65) Prior Publication Data

US 2008/0113687 A1 May 15, 2008

(51) Int. Cl.
*H04M 1/00* (2006.01)
(52) U.S. Cl. ............... 455/558; 455/432.3; 455/435.1; 455/433; 455/414.1
(58) Field of Classification Search ............... 455/432.3, 455/435.1, 434, 433, 414.1, 432, 558
See application file for complete search history.

(56) References Cited

U.S. PATENT DOCUMENTS

| | | | |
|---|---|---|---|
| 6,230,002 B1 | 5/2001 | Floden et al. | |
| 7,474,894 B2 * | 1/2009 | Cardina et al. | 455/432.3 |
| 2008/0005577 A1 * | 1/2008 | Rager et al. | 713/183 |

* cited by examiner

*Primary Examiner* — Charles N Appiah
*Assistant Examiner* — Randy Peaches
(74) *Attorney, Agent, or Firm* — O'Keefe, Egan, Peterman & Enders LLP

(57) ABSTRACT

Methods and systems for managing and/or tracking use of SIM smart cards with integrated or external SIM module systems that are utilized with information handling systems. A SIM module system may be locked with a generic locking code to lock a SIM module system of a given information handling system for use with a designated SIM smart card that is programmed with a matching generic locking code. The locked SIM module system of the information handling system may be further configured so that it may be unlocked using an unlocking code so as to allow use of the information handling system with SIM smart cards other than the designated SIM smart card. To allow tracking of the disposition of the designated SIM smart card, notification of the non-activation, de-activation and/or activation of the designated SIM smart card (e.g., to an activation tracking agent) may be required before obtaining the unlocking code, for example, from an activation tracking agent.

19 Claims, 6 Drawing Sheets

METHODS AND SYSTEMS FOR MANAGING AND/OR TRACKING USE OF SUBSCRIBER IDENTITY MODULE COMPONENTS

FIELD OF THE INVENTION

This invention relates generally to subscriber identity module (SIM) smart cards and, more particularly, to methods and systems for managing and/or tracking use of subscriber identity module smart cards.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often configured as portable devices. One popular type of portable information handling system is a notebook computer. Wireless wide area network (WWAN) capability has been implemented for notebook computers using wireless cellular technology and integral and/or external components. The wireless cellular business is based on a service model that is operated over a licensed spectrum, and is typically provided by wireless carriers and operators. End user devices are typically activated and provisioned onto a cellular carrier network, and retention of the users on a given carrier network is desirable for the carrier network.

Notebook computers may be provided to customers by Enterprise providers with wholly integrated wireless wide area network ("WWAN") SIM module systems that are provided as components integrated as part of the notebook computers, or with external attachable WWAN SIM module systems in the form of insertable mobile broadband data cards (PCMCIA-based cards). These integrated or external SIM module systems are cellular radio frequency (RF) transceiver modules that accept or interface with SIM smart cards, including 3G-compliant Universal Subscriber Identity Module ("USIM") smart cards, that contain network activation data and user account data and that are linked to a specific cellular network carrier. However, a customer may replace the USIM smart card shipped with the computer with a different USIM smart card that they already own (e.g., third party, different carrier, different plan), or with a different USIM smart card that the customer has purchased at a retail store. The substitution of a different USIM smart card by the customer is transparent to the Enterprise provider, so that the Enterprise provider has no knowledge or visibility of an account activation using another USIM smart card.

SIM locking methods have been implemented in the past for anti-theft purposes. In one example, a mobile device handset is locked to a particular cellular carrier's network. This method is employed to prevent stolen mobile devices from being used on other cellular carrier networks. In another example, a mobile device handset is locked to a particular SIM smart card, so that the mobile device will not work with any other SIM smart card. This method is employed to prevent a thief from using the stolen mobile device with another SIM smart card.

SUMMARY OF THE INVENTION

Disclosed herein are methods and systems for managing and/or tracking use of SIM smart cards (e.g., USIM smart cards) with SIM module systems that are integrated with other components of an information handling system (e.g., embedded SIM module systems such as embedded mini PCIe interface standard modules, etc.), and external attachable non-integrated SIM module systems (e.g., insertable and removable mobile broadband data cards such as standard size PCMCIA cards, PCIe interface standard-based PCMCIA cards, Express PCMCIA cards, etc.). In one embodiment such SIM module systems may be utilized as WWAN SIM module systems to provide WWAN capability to an information handling system, such as desktop computer or notebook computer, personal data assistant (PDA) or other type of portable information handling system (e.g., MP3 players, cameras, computer peripherals, portable telephone devices such as cellular phones, cordless phones, etc.), etc.

The disclosed methods and systems may be implemented in one exemplary embodiment to encourage customer activation of a designated SIM smart card associated with a given Enterprise provider of an information handling system and to encourage increased retention of use of the designated SIM smart card by the customer, e.g., by encouraging a customer user to activate and use a designated SIM smart card that is originally provided for use with a WWAN SIM module system of an information handling system by the Enterprise provider of the information handling system. The designated SIM smart card may be optionally configured so that it only operates with a particular WWAN network provider or with multiple WWAN network providers designated by the Enterprise provider, in which case the disclosed methods and systems may also be implemented to encourage increased retention of the customer on the WWAN network/s designated by the Enterprise provider. However, such linking of a designated SIM smart card to a particular WWAN network provider is not necessary.

In one embodiment, the disclosed methods and systems may be implemented by locking a SIM module system (e.g., integrated SIM module system, external mobile PCMCIA data card, etc.) with a generic locking code (i.e., a locking code that has the characteristic of being generic and non-unique to specific hardware components such as specific information handling system, SIM module system, SIM smart card, etc.) so that it will only function with a SIM smart card when provided with the generic locking code. This generic locking code may be, for example, an Enterprise locking code with and specific to an Enterprise provider of a given information handling system (e.g., such as notebook computer or other portable information handling system) rather than being specific to any given cellular carrier, and thus may be independent and different from of any other type of locking code that may be provided, such as a carrier locking code or SIM provider locking code. The generic locking code may be implemented to lock a SIM module system of the given information handling system for use with a designated SIM smart card that is programmed with a matching generic locking code. Such a designated SIM smart card may be, for example, a SIM smart card (e.g., USIM smart card) that is provided with the given information handling system when it is shipped or otherwise provided by the Enterprise provider of the information handling system. In such a case, the designated SIM smart card may be programmed with a matching generic locking code so as to allow use of the designated SIM smart card with the locked SIM module system. The SIM module system of a given information handling system may be so locked to prevent use of the information handling system with any SIM smart card other than the designated SIM smart card, i.e., any SIM smart card that is not programmed to supply the matching generic locking code.

In a further embodiment, the locked SIM module system of the information handling system may be further configured so that it may be unlocked using an unlocking code that may be unique for each SIM module system (e.g., unique control key) so as to allow use of the information handling system with SIM smart cards other than the designated SIM smart card to which the SIM module system was originally locked for use (e.g., third party SIM smart cards, after-market SIM smart cards, etc.). This unlocking capability feature may be implemented in a manner so as to facilitate tracking of the disposition of the designated SIM smart card (e.g., to provide notification and/or reason for non-activation or de-activation of the designated SIM smart card). For example, if a user of the information handling system wishes to use a SIM smart card other than the designated SIM smart card with the locked SIM module system, the user may be required to first provide notification of the non-activation or de-activation of the specific designated SIM smart card (e.g., to the Enterprise provider of the information handling system or to an activation tracking agent acting on behalf of the Enterprise provider) before obtaining the unlocking code. The user may be further required to provide a reason for non-activation or de-activation of the designated SIM smart card. In the case where the designated SIM smart card is activated for use with the locked SIM module system, automatic or user-performed unlocking of the SIM module system may initiated to provide notification of the activation of the designated SIM smart card before obtaining the unlocking code.

In one respect, disclosed herein is a method for tracking subscriber identity module (SIM) system use, including: providing an information handling system; providing a SIM module system for the information handling system, the SIM module system being configured for use with a SIM smart card to access a wireless network; locking the SIM module system; programming the SIM module system to unlock when it is provided with an unlocking code so that it will access the wireless network; receiving a request for the unlocking code, the request specifically identifying the locked SIM module system; providing the unlocking code in response to the request; and tracking the receipt of the request for the specific locked SIM module system.

In another respect, disclosed herein is an information handling system, including a SIM module system configured for use with a SIM smart card to access a wireless network, the SIM module system being locked with an Enterprise locking code that is specific to an Enterprise provider of the information handling system.

In another respect, disclosed herein is a method for managing use of a subscriber identity module (SIM) module system, including: providing an information handling system; providing a SIM module system for the information handling system, the SIM module system being configured for use with a SIM smart card to access a wireless network; and locking the SIM module with an Enterprise locking code that is specific to an Enterprise provider of the information handling system.

DESCRIPTION OF ILLUSTRATIVE EMBODIMENTS

Figure 1:
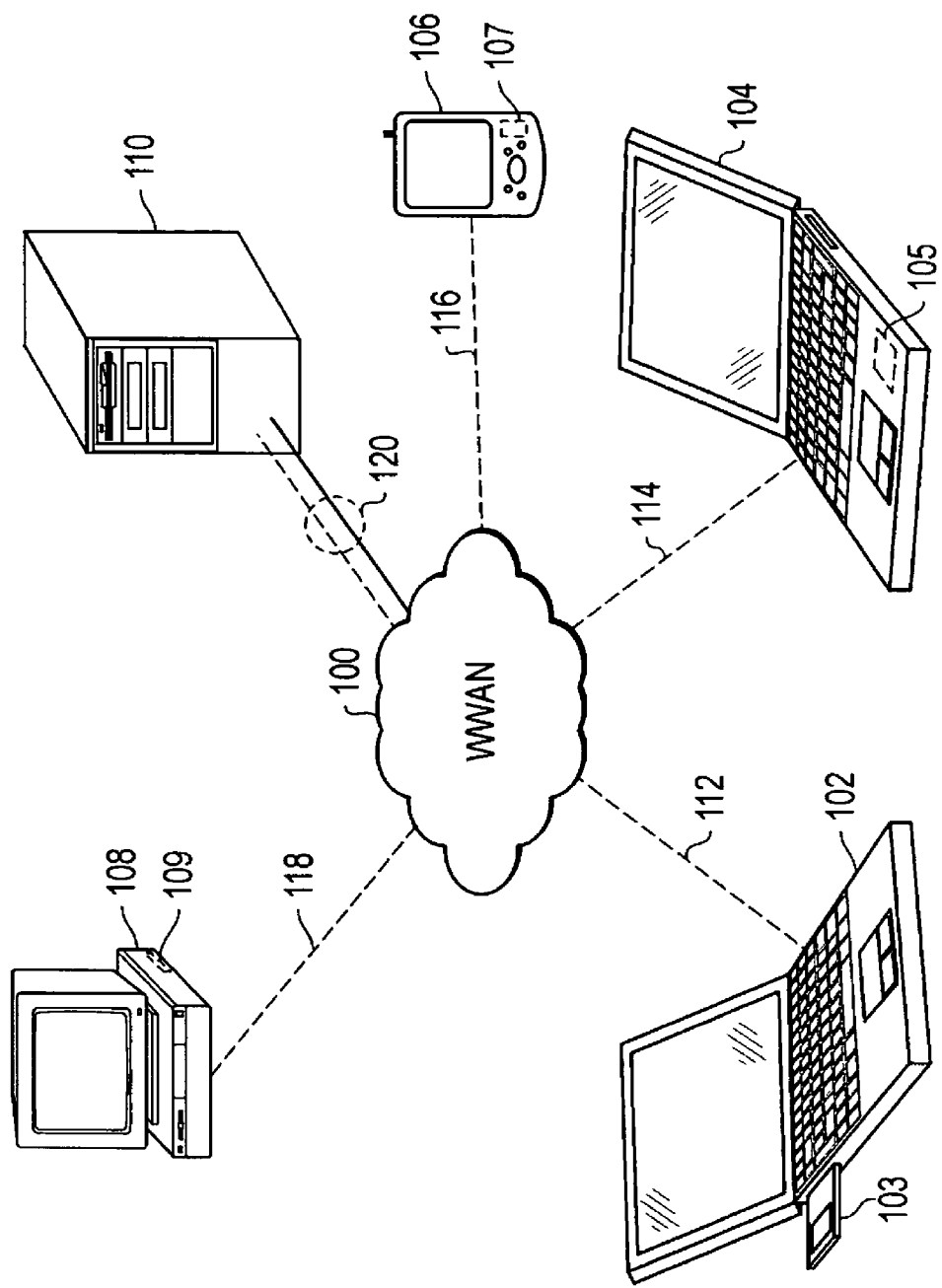
FIG. 1 is simplified representation of a plurality of information handling systems coupled to a wireless wide area network according to one embodiment of the disclosed methods and systems.

FIG. 1 illustrates four information handling systems 102, 104, 106 and 108 that are each wirelessly coupled to a WWAN 100, such as the Internet, via respective cellular data communication links 112. 114, 116 and 118. Also shown in FIG. 1 is an information handling system 110 configured as a tracking agent server that may be coupled to WWAN 100 via a wireless and/or hardwire data communication link 120 as shown. In this illustrated exemplary embodiment, each of information handling systems 102, 104, 106 and 108 is provided with a SIM module system that may be configured as a radio frequency (RF) transceiver module to provide cellular transmission and reception capability to its respective information handling system. Each SIM module system also is configured to accept a SIM smart card that contains network activation data and user account data corresponding to each information handling system.

In the exemplary embodiment of FIG. 1, information handling system 102 is a notebook computer provided with a SIM module system 103 in the form of external mobile PCMCIA data card, information handling system 104 is a notebook computer provided with an integrated (e.g., embedded) SIM module system 105, information handling system 106 is a personal data assistant (PDA) with an integrated (e.g., embedded) SIM module system 107, information handling system 108 is a desktop computer system provided with integrated (e.g., embedded) SIM module system 109 that may be, for example, provided in the form of PCI card. Information handling system 110 may be provided with any wireless or hardwire data communication system components suitable for providing data communication with WWAN 100.

Figure 2:
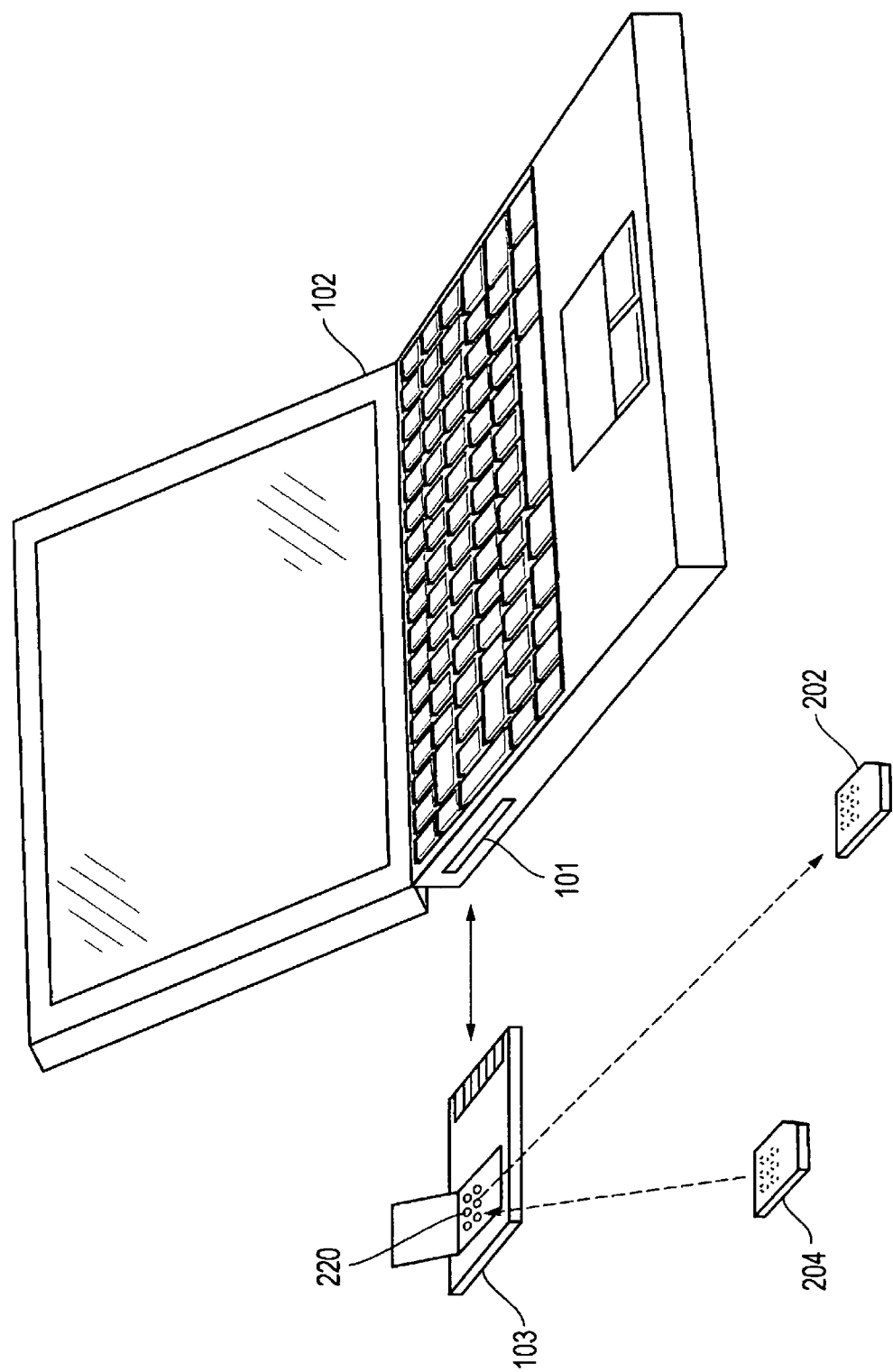
FIG. 2 shows an information handling system with external SIM module system according to one embodiment of the disclosed methods and systems.

FIG. 2 shows information handling system 102 of FIG. 2 with SIM module system 103 in the form of external mobile PCMCIA data card that is removably insertable into a corresponding PCMCIA slot 101 in the side of information handling system 102. As shown in FIG. 2, a cavity 220 is defined in external mobile PCMCIA data card 103 for removably receiving and exchanging SIM smart cards. More particularly, dashed arrows of FIG. 2 shows a designated SIM smart card 202 as it may be optionally removed by a user from SIM module system 103 and replaced with another SIM smart card 204 (e.g., third party SIM smart cards, after-market SIM smart cards, etc.).

Figure 3:
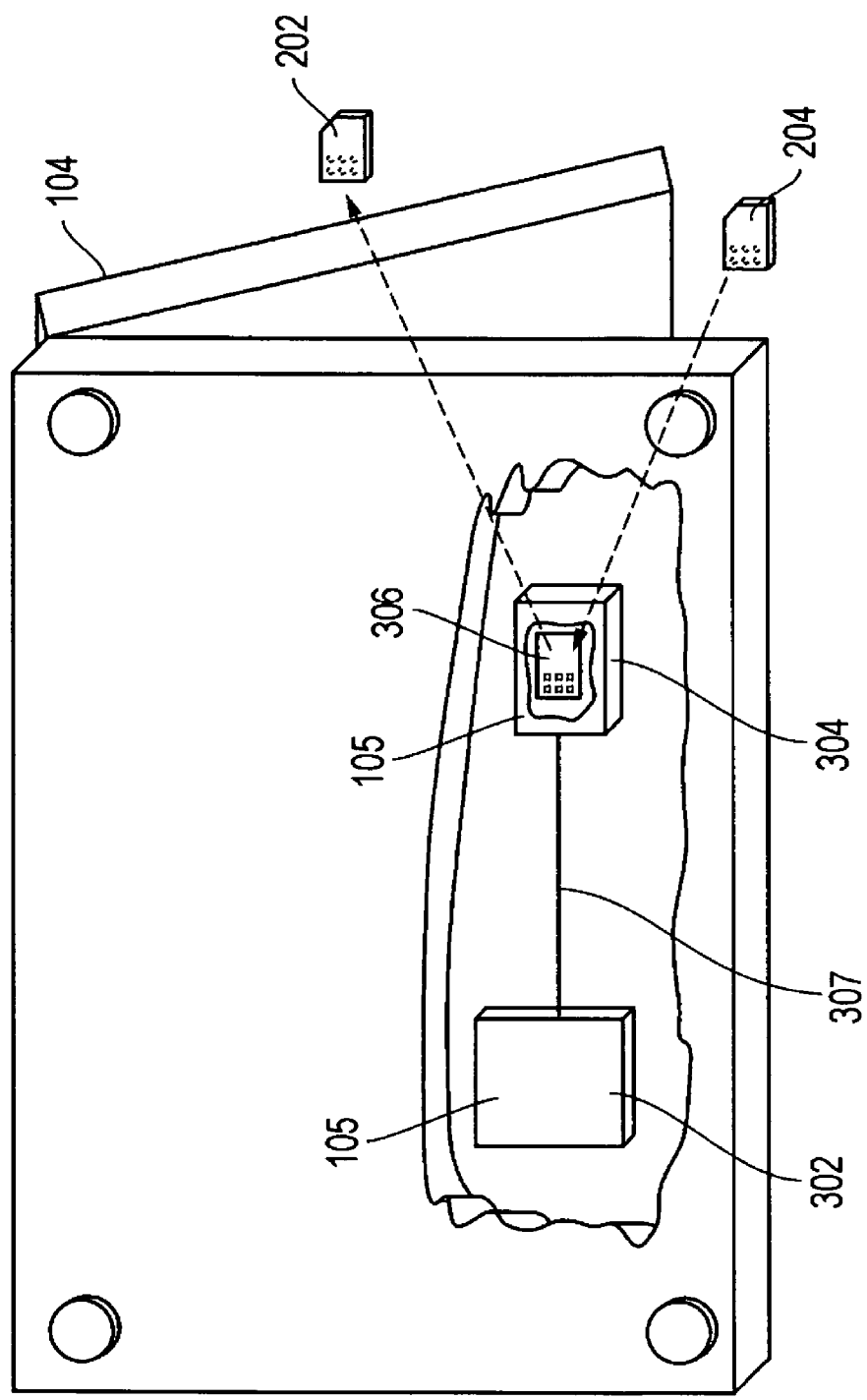
FIG. 3 is a cut-away view showing an information handling system with integrated SIM module system according to one embodiment of the disclosed methods and systems.

FIG. 3 shows information handling system 104 of FIG. 2 with cut out section showing two component integrated (e.g., embedded) SIM module system 105 that includes transceiver component 302 SIM smart card receptacle component 304 coupled together with connector wire 307 and disposed within the chassis of information handling system 104, although a single component SIM module system is also possible. As shown in FIG. 3, a cavity 306 is defined in receptacle component 304 for removably receiving and exchanging SIM smart cards, e.g., via access in the battery compartment of information handling system 104. More particularly, FIG. 3 shows a designated SIM smart card 202 as it may be optionally removed by a user from SIM module system 105 and replaced with another SIM mini card 204 (e.g., third party SIM smart cards, after-market SIM smart cards, etc.). It will be understood that an integrated (e.g., embedded) SIM module system may alternatively be a single component device, or may include more than two components.

Figure 4:
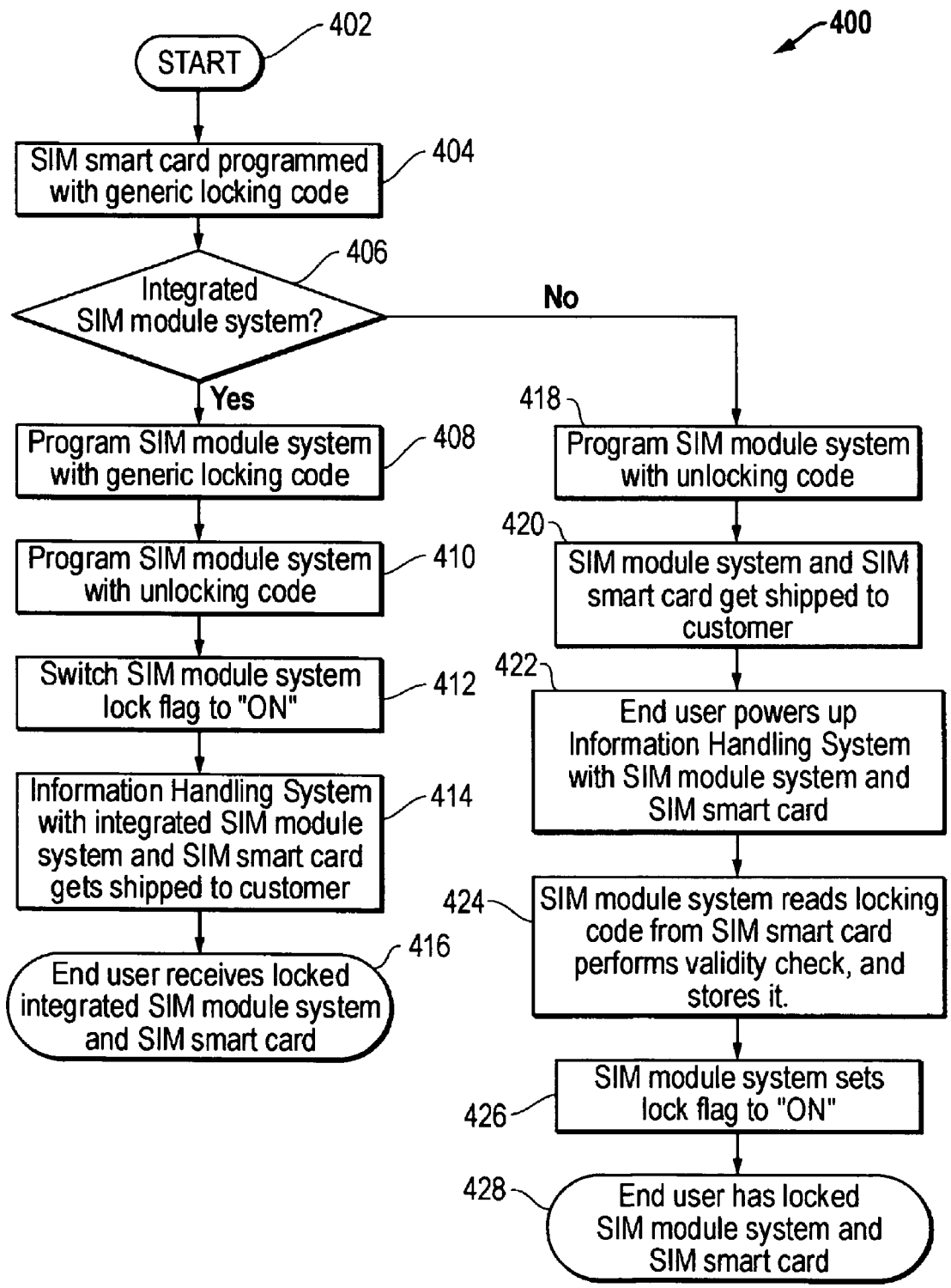
FIG. 4 is a flow chart illustrating methodology for locking SIM module systems according to one exemplary embodiment of the disclosed methods and systems.

FIG. 4 is a flow chart illustrating methodology 400 for locking SIM module systems according to one exemplary embodiment of the disclosed methods and systems. As shown, methodology begins at step 402 and moves to step 404 where a designated SIM smart card is programmed with a generic locking code (i.e., a locking code that has the characteristic of being generic and non-unique to specific hardware components such as a specific information handling system, SIM module system, SIM smart card, etc.). In one exemplary embodiment, such a generic locking code may be generic to hardware components, but at the same time may be specific to an Enterprise provider of an information handling system (e.g., such as notebook computer or other portable information handling system) with which the designated SIM smart card is to be provided, meaning that this generic locking code, although generic in terms of the information handling system and other hardware components employed therewith, is unique to the Enterprise provider of the information handling system. In other words, a generic locking code used by one Enterprise provider is different from a generic locking code used by all other Enterprise providers of information handling systems. The designated SIM smart card may be programmed in step 404 by a provider (e.g., manufacturer or supplier) of the designated SIM smart card, although it may be alternatively so programmed by any other suitable party, e.g., Enterprise provider of an information handling system, etc. It will also be understood that other types of locking codes may be employed in other embodiments including, but not limited to, a non-generic locking code that is specific to one or more hardware components, a non-generic locking code that is specific to an Enterprise provider of a given information handling system and that is also specific to one or more hardware components employed with the given information handling system, etc.

After step 404, methodology 400 proceeds differently for SIM module systems integrated with an information handling system (e.g., integrated with a portable information handling system such as notebook computer) than for SIM module systems that are originally provided as separate components external to an information handling system. This is illustrated in step 406 where methodology 400 proceeds with steps 408 to 416 if the SIM module system is an integrated SIM module system (e.g., such as integrated SIM module systems 105, 107 and 109 of FIGS. 1 and 3), but proceeds with steps 418 to 428 if the SIM module system is an external SIM module system (e.g. such as SIM module system 103 of FIGS. 1 and 2). In one example, steps 408 to 412 may be performed, for example, by an Enterprise provider of an information handling system with integrated SIM module system (e.g., performed in the factory of the Enterprise provider during factory diagnostic procedures), while steps 418 to 428 may be performed by an original equipment manufacturer (OEM) of an external SIM module system that is provided to as a separate component from an information handling system. However, it will be understood that steps 408 to 416 and/or steps 418 to 428 may be performed by any other suitable entity or entities.

Still referring to step 406, if the SIM module system is an integrated S412IM module system then methodology proceeds next to step 408 where the integrated SIM module system is programmed with the same generic locking code that the designated SIM smart card was programmed with in step 404. As previously described, the integrated SIM module system is now locked so that it will only function with a given SIM smart card when the given SIM smart card provides this generic locking code to the integrated SIM module system. Therefore, since the designated SIM smart card was programmed with the generic locking code in step 404, the designated SIM smart card is now capable of operating with the locked SIM module system for cellular communication purposes. However, if another SIM smart card that is not programmed with the generic locking code is inserted into the locked SIM module system, this other SIM module system will not function and will not be capable of cellular communication.

Next, in step 410, the integrated SIM module system is programmed with an unlocking code that may be unique for each SIM module system (e.g., a unique control key that is assigned to each SIM module system and that is different for each given SIM module system to which it is assigned). In one exemplary embodiment, an unlocking code may be a unique Enterprise control key that is generated using a pseudo-random number generator based on the integrated (e.g., embedded) SIM module system IMEI (International Mobile Equipment Identifier), i.e., the serial number. The SIM module system is programmed with the unlocking code in step 410 so that the SIM module system may be later unlocked when it is provided with the same unique unlocking code so as to allow use of the information handling system with SIM smart cards that are not programmed with the generic locking code (e.g., SIM smart cards other than the designated SIM smart card to which the SIM module system was originally locked for use). Although a one possible embodiment of Enterprise control key is described above, it will be understood that any form of unlocking code suitable for accomplishing the above-described purpose may be alternatively employed. Such an unlocking code may be, for example, a non-unique unlocking code that is suitable for use to accomplish the unlocking and activation tracking features described herein.

Next, in step 412, SIM module system lock flag (e.g., Enterprise lock flag) is switched to "ON" for the purpose of indicating that the SIM module system lock is now active, and the information handling system (e.g., notebook computer or other portable information handling system) that includes the integrated SIM module system and the designated programmed SIM smart card of step 404 is shipped or otherwise provided to a customer or other end user in step 414. Thus, the customer or other end user receives the information handling system with the integrated SIM module system and designated SIM smart card, and with the integrated SIM module system in locked condition such that it may be only utilized with a SIM smart card that is programmed to provide the appropriate generic locking code to the SIM module system.

Returning now to step 406, if the SIM module system is a non-integrated external SIM module system that is provided as a physically separate component from the information handling system (e.g., such as external SIM module system 103 of FIGS. 1 and 2), then methodology 400 proceeds to steps 418 to 428 which may be performed, for example, by the manufacturer (e.g., original equipment manufacturer "OEM") of the non-integrated external SIM module system, where the external SIM module system is programmed with an unlocking code (e.g., a unique control key such as described with regard to step 410). As with integrated SIM module system of step 410, the external SIM module system of step 418 is programmed with the unlocking code (e.g., unique Enterprise control key) so that the SIM module system may be later unlocked when it is provided with the same unique unlocking code so as to allow use of the information handling system with SIM smart cards that are not programmed with the generic locking code. The external module system and designated SIM smart card are then shipped or otherwise provided to a customer or other end user in step 420. In one embodiment, the external module system and designated SIM smart card of step 420 may be provided as physically separate components from an information handling system with which they are to be employed (e.g., provided to the end user in a different package and from a different provider than the provider of the information handling system).

Next, in step 422, the customer or other end user then assembles the external SIM module system and designated SIM smart card with the information handling system, and powers up the assembly. As shown in FIG. 424, on first power up the external SIM module system is programmed to automatically read the locking code from the designated SIM smart card that was programmed in step 404, and then stores the locking code in its memory. The SIM module system also performs a self-check to ensure that this locking code is valid (e.g., by performing the steps of checking that the code is a non-default value, that it is correctly formatted, and that it is within a range designated to locking codes) and is successfully stored. In step 426, the external SIM module system sets its lock flag (e.g., Enterprise lock flag) to "ON" for the same purposes as described with regard to step 412. As shown in step 428, the end user now has an external SIM module system that is in locked condition such that it may be only utilized with a SIM smart card that is programmed to provide the appropriate generic locking code to the SIM module system, similar to the state of integrated SIM module system of step 416.

Figure 5A:
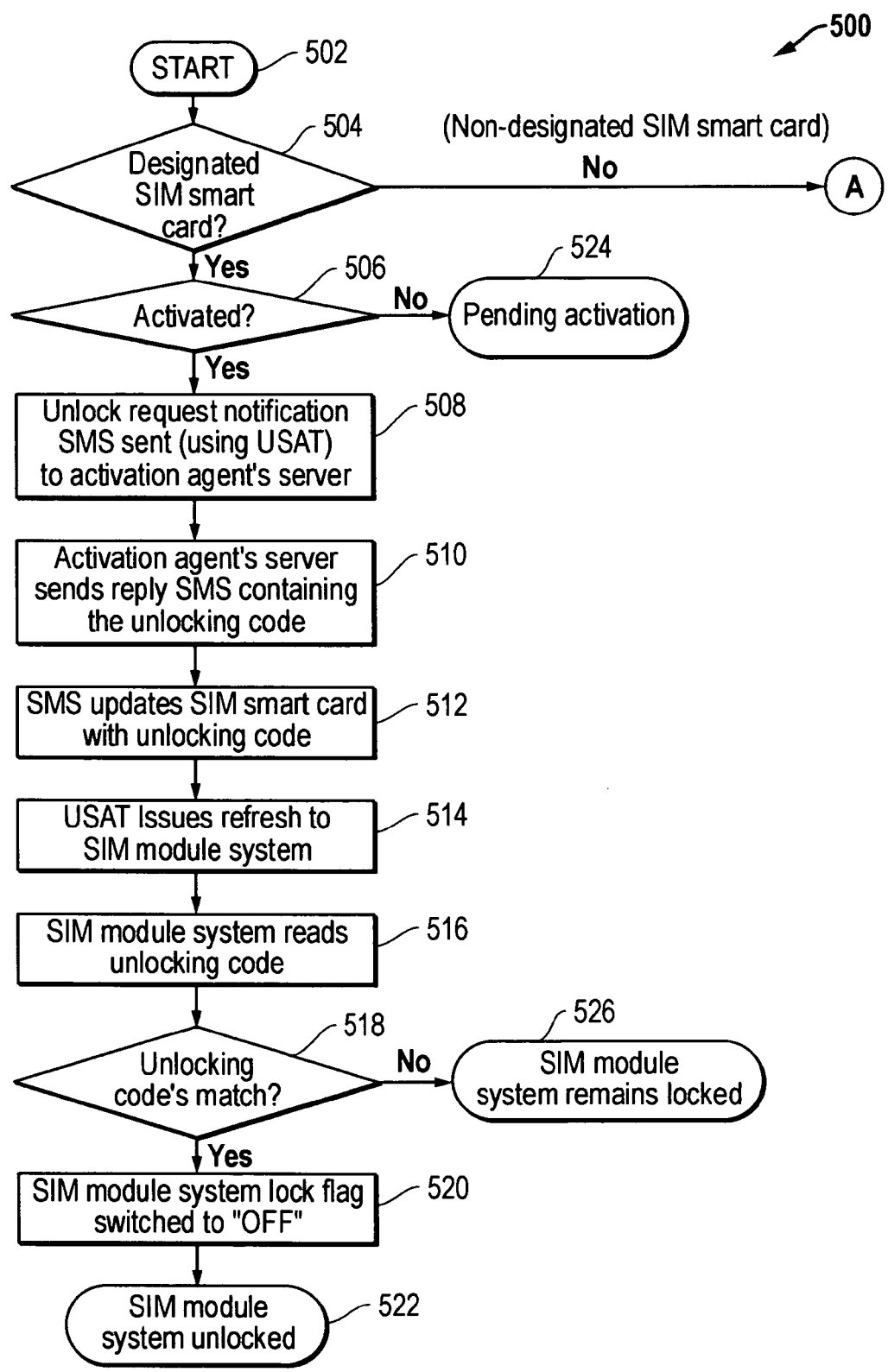
FIG. 5 is a flow chart illustrating methodology for unlocking SIM module systems according to one exemplary embodiment of the disclosed methods and systems.
Figure 5B:
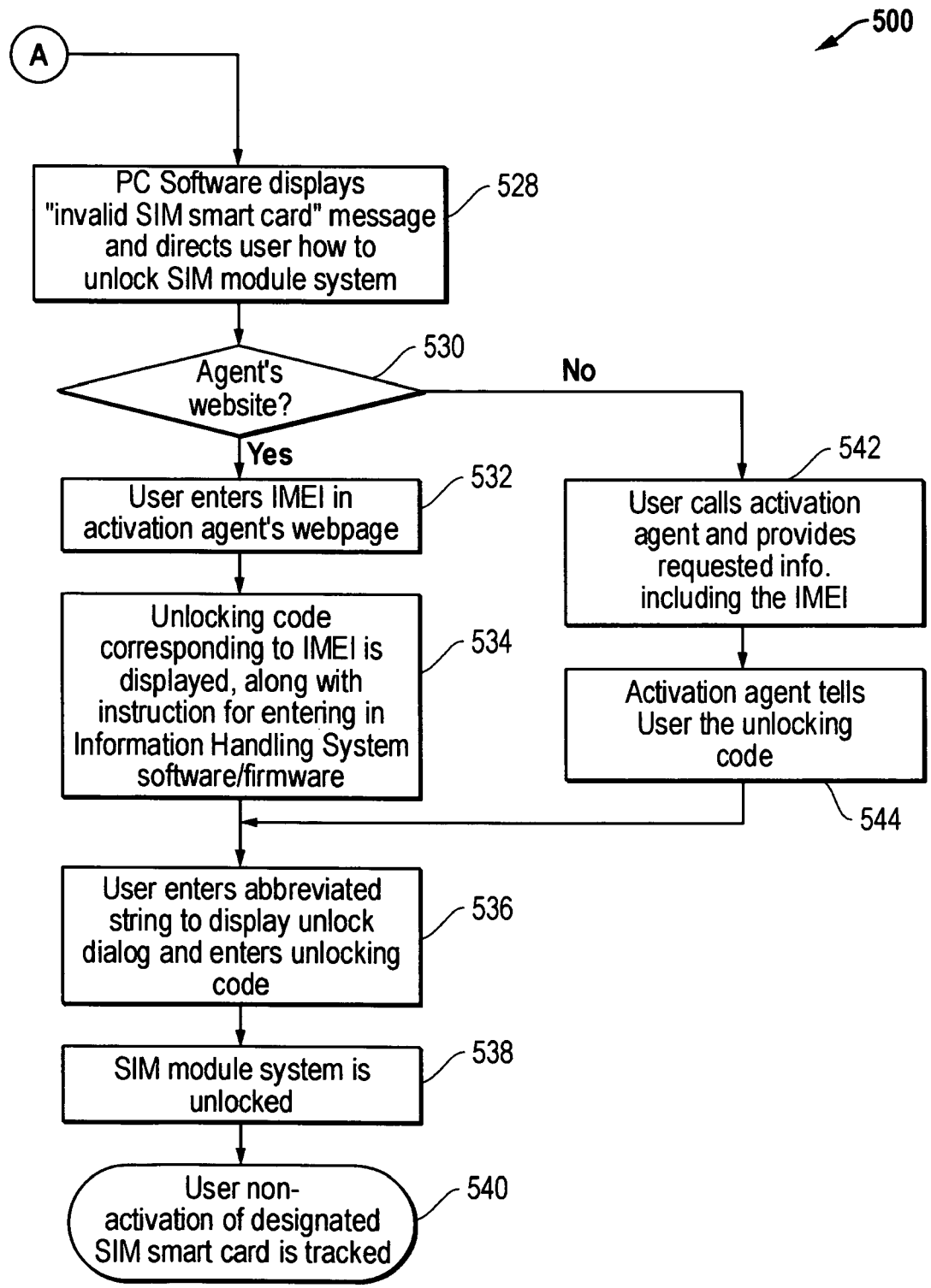

FIG. 5 is a flow chart illustrating methodology 500 according to one exemplary embodiment of the disclosed methods and systems for unlocking SIM module systems of that have been locked according to methodology 400 of FIG. 4. In the locked condition, such a SIM module system will only function normally with a designated SIM smart card (that possesses a matching locking code such as that applied using methodology 400) to allow a user to access wireless network communications. Methodology 500 may be implemented, for example, to unlock external SIM module systems such as SIM module system 103 of FIG. 1, or to unlock integrated (e.g., embedded) SIM module systems such as SIM module systems 105, 107, and 109 of FIG. 1. As shown, methodology begins at step 502 and moves to step 504 when, for example, a customer or other user attempts to use the SIM module system of an information handling system (e.g., one of information handling systems 102, 104, 106 or 108 of FIG. 1) with a given SIM smart card. If the SIM smart card is a designated SIM smart card (e.g., such as a SIM smart card that is programmed in Step 404 of FIG. 4 with a generic locking code that is associated with and specific to an Enterprise provider of an information handling system), then methodology 500 proceeds to steps 506 to 522 as shown. A designated SIM smart card may be identified by its possession of the generic locking code.

In step 506, it is determined if successful account activation has yet occurred for the designated SIM smart card, i.e., meaning that the information handling system and/or SIM module system checks for and/or is supplied with information (e.g., by the user) as to whether or not the user of the SIM smart card has successfully activated their account with their wireless service provider. If not, then the SIM module system is pending activation as shown in step 524, meaning that that the SIM smart card has not been activated by the user so the SIM module system cannot be used with the designated SIM smart card to access wireless service. However, if account activation has previously occurred for the designated SIM smart card, an activation tracking agent is notified of the activation of the designated SIM smart card by an unlock notification message as shown in Step 508, which identifies the SIM module system to the activation tracking agent. For example, in one exemplary embodiment account activation may be detected by an activation tracking agent, for example, using an Application Toolkit ("AT") command that triggers an unlock request notification message in the form of a Short Message Service ("SMS") message to be sent in Step 508 (e.g., transparently to the end user using USIM Application Toolkit "USAT"), from the information handling system (e.g., information handling system 102, 104, 106 or 108 of FIG. 1) to the activation agent's server (e.g., tracking agent server 110 of FIG. 1). This unlock request notification message may contain information that identifies the particular locked SIM module system which is activated for use with the designated SIM smart card and which is progressing through the unlocking process. In one embodiment, the contents of this unlock request notification message may contain the integrated (e.g., embedded) SIM module system IMEI (International Mobile Equipment Identifier), i.e., the serial number, and the message is signed for authentication by the server. It will be understood that an unlock request notification message may be supplied in any other form of message suitable for transmitting information that identifies a given SIM module system activated with a designated SIM smart card and undergoing the unlocking process to an activation tracking agent.

Once an activation tracking agent has been notified of activation of the designated SIM smart card by receipt of an unlock request notification message, the unlocking code may be supplied to the information handling system so that the SIM module system may be unlocked for use with a SIM smart card for wireless networking communications. In the embodiment of FIG. 5, the receipt of the unlock request notification message causes the activation agent's server to send a reply message that contains the unlocking code (e.g., read from a database file containing the stored IMEIs and corresponding unlocking codes). For example, as shown in step 510, the activation agent's server may send a reply message (e.g., reply SMS message) to the information handling system of Step 508 that contains the unlocking code (e.g., Enterprise control key) that was programmed in the SIM module system during methodology 400 of FIG. 4. In step 512, the SIM smart card is updated with the unlocking code provided by the activation agent's server. For example, in one embodiment, the reply message (e.g., by the reply SMS) from the activation agent's server may automatically update a file in the SIM smart card with the unlocking code in a manner that is transparent to the end user, although user participation in the update process is possible in other embodiments.

Once the SIM smart card has been updated with the unlocking code, the SIM module system may be supplied with this unlocking code to complete the unlocking process. For example, in the exemplary embodiment of FIG. 5, the SIM smart card may instruct the SIM module system to perform a refresh procedure (e.g., by USAT issuing a refresh request) in Step 514, and in response thereto the SIM module system may read the locking code from the designated SIM module system in Step 516.

In Step 518, the SIM module system may then compare the unlocking code read from the SIM smart card with the unlocking code programmed in the SIM module system in Step 410 of FIG. 4. If the unlocking codes are found to match in Step 518, then the SIM module system lock flag (e.g., Enterprise lock flag) is switched to "OFF" in Step 520 and the SIM module system is unlocked to allow a user to access wireless network communications in Step 522. The unlocking code in the SIM smart card is reset to a default value (such as a value that contains only hexadecimal 'F' digits, e.g. 'FFFF', which cannot be used to represent a valid code) by the SIM smart card. However, if the unlocking codes are not found to match in Step 518, then the SIM module system remains locked in Step 526 so that it does not allow a user of the information handling system to access wireless network communications.

Returning now to Step 504 of FIG. 5, if a customer or other user attempts to use the SIM module system of an information handling system (e.g., one of information handling systems 102, 104, 106 or 108 of FIG. 1) with a SIM smart card that is not a designated SIM smart card that is programmed with the generic locking code of Step 404 of FIG. 4, then a user may be allowed to manually unlock the SIM module system for use by providing the appropriate unlocking code to the SIM module system, for example, as shown in Steps 528 to 540 of FIG. 5.

In Step 528 of FIG. 5, a given information handling system may be programmed with software, firmware or combination thereof that interacts with a locked SIM module system that a customer or other user is attempting to use with a non-designated SIM smart card (i.e., a SIM smart card that is not programmed with the generic locking code of Step 404 of FIG. 4) and that displays a message that instructs the customer or other user of the given information handling system how to unlock the locked SIM module system of the given information handling system for use with the non-designated SIM smart card. In one exemplary embodiment, a software/firmware application may display a message that states that the SIM smart card is invalid and that provides activation agent contact information (e.g., a phone number and/or website) where further unlocking instructions and/or information may be obtained, e.g., software and/or firmware application executing on the given information handling system may display an error message such as:

"Invalid USIM. To unlock your data card call 1-800-XXX-XXXX, or go to www.activationagent.com, and enter your card/module IMEI."

In such an embodiment, methodology 500 may proceed from step 530 to steps 532 and 534 in the case where an activation agent website is provided, may proceed to steps 542 and 544 where an activation agent phone number is provided, or the user may choose between the two options in step 530 where both options are provided. In step 532, the customer or other user may access the activation agent website and provide sufficient information (e.g., SIM module system IMEI) to an activation agent server 110 through the website to establish the identity of the SIM module system, particular user associated with the SIM module system, and/or the given information handling system that includes the SIM module system. A user may be optionally required to provide further information, e.g., such as a reason for non-activation or de-activation of the designated SIM smart card.

In response to the information provided in step 532, the activation agent may then provide the unlocking code (e.g., unique enterprise control key) to the user via the website, and record the non-activation of a designated SIM smart card with the SIM module system, user and/or information handling system identified in step 532. For example, in one embodiment employing a self-service website, a user may simply enter the IMEI and their unlocking code (e.g., unique enterprise control key) is displayed.

Alternatively, the customer or other user may call the activation agent phone number in step 542 and provide sufficient information (e.g., SIM module system IMEI) to an activation agent representative or computer through the phone connection to establish the identity of the SIM module system, particular user associated with the SIM module system, and/or the given information handling system that includes the SIM module system. Other optional information such as reason for non-activation or de-activation of designated SIM smart card may also be required to be provided at this time. In response, an activation agent representative or computer may tell the unlocking code (e.g., unique enterprise control key) to the user via the website, and record the non-activation of a designated SIM smart card with the SIM module system, user and/or information handling system identified in step 532.

After a user obtains the unlocking code by either steps 532 to 534, or steps 542 to 544, then the user may provide the obtained unlocking code to software and/or firmware application via a user interface of the given information handling system. This application may provide the unlocking code to the SIM module system of the given information handling system for comparison with the unlocking code programmed into the SIM module system, or may otherwise compare the user-obtained locking code with the SIM module system-programmed unlocking code. For example, as shown in step 536, the user may enter the unlocking code by first entering an abbreviated string (e.g., a character string such as "##0") when the software and/or firmware application is running. The application may then display the application unlocking dialog (e.g., Enterprise Unlock dialog) in response, and the user may then enter the unlocking code. In any case, once the unlocking code has been entered by the user and if the entered and programmed unlocking codes match, the SIM module system is unlocked as shown in step 538. At this time, the user may proceed with use of the SIM module system with a non-designated SIM smart card and the non-activation of a designated SIM smart card (e.g., SIM smart card provided by an Enterprise provider of the given information handling system) is tracked by the activation agent as shown in step 540.

In one exemplary embodiment, a designated SIM smart card may be a SIM smart card that is provided by an Enterprise provider of a given information handling system, and non-activation of this designated SIM smart card with an integrated or external SIM module system of the given information handling system may be tracked by an activation agent in step 540. The Enterprise provider of the given information handling system may be informed of the non-activation of the designated SIM smart card, and will therefore be aware that use of a non-designated SIM smart card is the reason for the non-activation of the designated SIM smart card rather than for another reason, such as non-use of the SIM module system of the given information handling system.

It will be understood that the locking and unlocking methodologies of FIGS. 4 and 5 are exemplary only and that any other sequence of the existing steps, and/or any other combination of additional and/or fewer steps, may be employed that is suitable for locking SIM module systems to achieve any one or more of the SIM smart card management and/or tracking features described herein. For example, in one alternative embodiment a SIM module system may be configured to remain locked as long as it is used with the designated SIM smart card, and not be unlocked until a user attempts to de-activate and/or replace the designated SIM smart card with a non-designated SIM smart card for use with the locked SIM module system, i.e., without implementing steps 508 to 522. Upon a user attempt to employ a non-designated SIM smart card, an unlocking procedure similar to steps 528 to 540 of FIG. 5 may be implemented to unlock the SIM module system for use with the non-designated SIM smart card. In another alternative embodiment, a user may be required to obtain an unlocking code by calling an activation agent and/or by accessing an activation agent website even when a SIM module system is operated with a designated SIM smart card, i.e., automatic unlocking of steps 508 to 522 of FIG. 5 is an optional feature and manually unlocking steps may alternatively employed. In this latter case, a user may be required to provide the activation agent with information that identifies the specific designated SIM smart card being used with the SIM module system prior to obtaining the unlocking code from the activation agent so that activation of the designated SIM smart card may be tracked. The user may then manually enter the unlocking code in a manner similar to that described for steps 536 to 538 of FIG. 5.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method for tracking subscriber identity module (SIM) system use, comprising:
   providing an information handling system;
   providing a SIM module system for said information handling system, said SIM module system being configured for use with a SIM smart card to access a wireless network;
   locking said SIM module system;
   programming said SIM module system to unlock when it is provided with an unlocking code so that it will access said wireless network;
   receiving a request for said unlocking code, said request specifically identifying said locked SIM module system;
   providing said unlocking code in response to said request; and
   tracking said receipt of said request for said specific locked SIM module system.

2. The method of claim 1, wherein said specific locked SIM module system is being operated with an activated SIM smart card designated by an Enterprise provider of said information handling system that is not a cellular provider; and further comprising tracking activation of said designated SIM smart card based on receipt of said request.

3. The method of claim 1, wherein said unlocking code is unique to said SIM module system, and said method further comprising:
   locking said SIM module system with an Enterprise locking code that is specific to an Enterprise provider of said information handling system and not specific to any given cellular carrier, the Enterprise locking code being independent and different from a carrier locking code or a SIM provider locking code;
   programming said SIM module system to lock said SIM module system so that it will only operate to access said wireless network with a designated SIM smart card when said locked SIM module system is provided with said Enterprise locking code by said designated SIM smart card;
   receiving said request from said locked SIM module system across said wireless network, said locked SIM module system being operated with an activated SIM smart card that comprises said designated SIM smart card;
   providing said unlocking code across said wireless network to said activated designated SIM smart card across said wireless network; and
   tracking activation of said designated SIM smart card based on receipt of said request from said SIM module system.

4. The method of claim 1, wherein said specific locked SIM module system is being operated with an activated SIM smart card that is not designated by an Enterprise provider of said information handling system, the Enterprise provider not being a cellular carrier; and further comprising tracking activation of said non-designated SIM smart card based on receipt of said request and informing the Enterprise provider of the information handling system of the use of a non-designated SIM smart card by said locked SIM module of said information handling system.

5. The method of claim 1, wherein said unlocking code is unique to said SIM module system, and said method further comprising:
   locking said SIM module system with an Enterprise locking code that is specific to an Enterprise provider of said information handling system and not specific to any given cellular carrier, the Enterprise locking code being independent and different from a carrier locking code or a SIM provider locking code;

programming said SIM module system to lock said SIM module system so that it will only operate to access said wireless network with a designated SIM smart card when said locked SIM module system is provided with said Enterprise locking code by said designated SIM smart card;

receiving said request from a user of said information handling system that has not activated a designated SIM smart card for use with said SIM module system;

providing said unlocking code to said user of said information handling system, said unlocking code being unique to said SIM module system; and tracking non-activation of a designated SIM smart card based on receipt of said request from said user of said information handling system and informing the Enterprise provider of the information handling system of the non-activation of the designated SIM smart card.

6. The method of claim 5, further comprising programming said information handling system to detect an attempt to use said SIM module system with a SIM smart card that is not designated by an Enterprise provider of said information handling system, and to automatically instruct said user how to request said unlocking code upon detection of said attempt to use said SIM module system with said non-designated SIM smart card.

7. The method of claim 1, wherein said information handling system comprises a notebook computer.

8. The method of claim 1, further comprising
locking said SIM module with an Enterprise locking code that is specific to an Enterprise provider of said information handling system and not specific to any given cellular carrier, the Enterprise locking code being independent and different from a carrier locking code or a SIM provider locking code.

9. The method of claim 8, further comprising programming said SIM module system to lock said SIM module system so that it will only operate to access said wireless network when said SIM module system is provided with said Enterprise locking code; providing a designated SIM smart card; and programming said designated SIM smart card to provide said Enterprise locking code to said SIM module system when it is used with said SIM module system.

10. The method of claim 8, further comprising programming said SIM module system to lock said SIM module system so that it will only operate to access said wireless network when said SIM module system is provided with said Enterprise locking code; and programming said SIM module system to unlock when it is provided with an unlocking code so that it will access said wireless network without being provided with said Enterprise locking code.

11. The method of claim 10, wherein said unlocking code is unique to said SIM module system, and said method further comprising:
providing a designated SIM smart card that is configured to provide said Enterprise locking code to said SIM module system when it is used with said SIM module system; and
providing said unlocking code across said wireless network to said designated SIM smart card in response to a request received from said SIM module system across said wireless network.

12. The method of claim 10, further comprising providing said unlocking code to a user of said information handling system in response to a request received from said user.

13. The method of claim 10, further comprising performing the following steps in the factory of the Enterprise provider of said information handling system prior to shipping the information handling system to a user: programming the SIM module system to lock said SIM module system so that it will only operate to access said wireless network when said SIM module system is provided with said Enterprise locking code; and programming said SIM module system to unlock when it is provided with an unlocking code so that it will access said wireless network without being provided with said Enterprise locking code.

14. The method of claim 8, wherein said information handling system comprises a notebook computer.

15. The method of claim 8, further comprising detecting an attempt to use said SIM module system with a SIM smart card that is not designated by an Enterprise provider of said information handling system that is not a cellular carrier, and informing the Enterprise provider of the information handling system of the use of a non-designated SIM smart card by said locked SIM module of said information handling system.

16. The method of claim 8, further comprising detecting an attempt to use said SIM module system with a SIM smart card that is not designated by an Enterprise provider of said information handling system that is not a cellular carrier, and then requiring the user to provide a reason for non-activation of a SIM smart card designated by the Enterprise provider of said information handling system before providing said unlocking code to said user of said information handling system.

17. The method of claim 1, further comprising:
receiving said request from a user of said information handling system that has not activated a designated SIM smart card for use with said SIM module system;
detecting if said request from said user is an attempt to use said SIM module system with a SIM smart card that is not designated by an Enterprise provider of said information handling system;
requiring the user to provide a reason for non-activation of the designated SIM smart card before providing said unlocking code to said user of said information handling system if said request from said user is detected as an attempt to use said SIM module system with a SIM smart card that is not designated by an Enterprise provider of said information handling system; and
then providing said unlocking code to said user of said information handling system, said unlocking code being unique to said SIM module system;
where the Enterprise provider of said information handling system is not a cellular carrier.

18. A method for managing use of a subscriber identity module (SIM) module system, comprising:
providing an information handling system;
providing a SIM module system for said information handling system, said SIM module system being configured for use with a SIM smart card to access a wireless network;
locking said SIM module with an Enterprise locking code that is specific to an Enterprise provider of said information handling system and not specific to any given cellular carrier, the Enterprise locking code being independent and different from a carrier locking code or a SIM provider locking code;
programming said SIM module system to lock said SIM module system so that it will only operate to access said wireless network when said SIM module system is provided with said Enterprise locking code; and programming said SIM module system to unlock when it is provided with an unlocking code so that it will access said wireless network without being provided with said Enterprise locking code; and performing the following steps in the factory of the Enterprise provider of said information handling system prior to shipping the information handling system to a user: programming the SIM module system to lock said SIM module system so that it will only operate to access said wireless network when said SIM module system is provided with said Enterprise locking code; and programming said SIM module system to unlock when it is provided with an unlocking code so that it will access said wireless network without being provided with said Enterprise locking code.

19. A method for managing use of a subscriber identity module (SIM) module system, comprising:

providing an information handling system;

providing a SIM module system for said information handling system, said SIM module system being configured for use with a SIM smart card to access a wireless network;

locking said SIM module with an Enterprise locking code that is specific to an Enterprise provider of said information handling system and not specific to any given cellular carrier, the Enterprise locking code being independent and different from a carrier locking code or a SIM provider locking code; and detecting an attempt to use said SIM module system with a SIM smart card that is not designated by an Enterprise provider of said information handling system that is not a cellular carrier, and then requiring the user to provide a reason for non-activation of a SIM smart card designated by the Enterprise provider of said information handling system before providing said unlocking code to said user of said information handling system.

* * * * *